J. Bryant,
Carpenter's Gage.
No. 448. Reissued Apr. 14, 1857.
Fig. 1
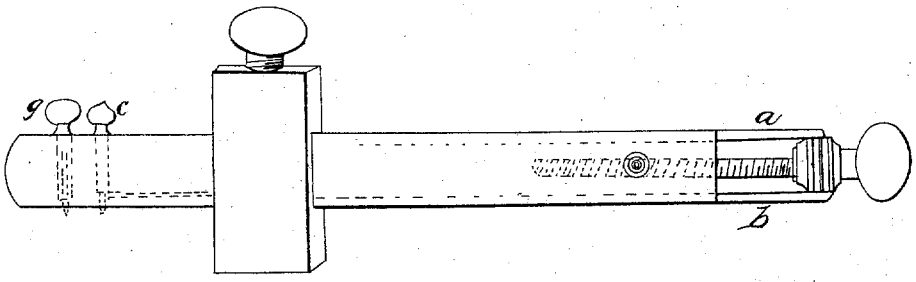
Fig. 2
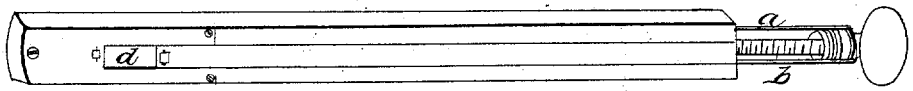
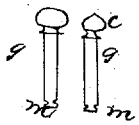
Fig. 3
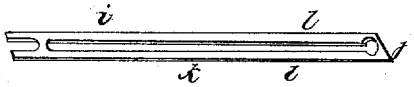
Fig. 4 Fig. 5
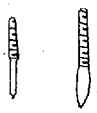
Fig. 6
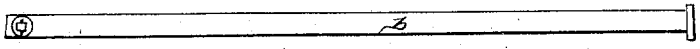
Fig. 7
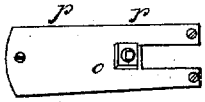
Fig. 8
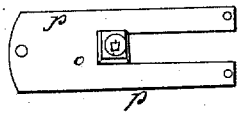
Fig. 9
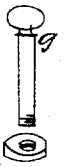
Witnesses:
E. G. Bryant
Charles Luck
Inventor:
Joel Bryant
AM. PHOTO-LITHO. CO. N.Y. (OSBORNE'S PROCESS.)

UNITED STATES PATENT OFFICE.

JOEL BRYANT, OF BROOKLYN, NEW YORK.

IMPROVED CARPENTER'S GAGE.

Specification forming part of Letters Patent No. 15,556, dated August 19, 1856; Reissue No. 448, dated April 14, 1857.

*To all whom it may concern:*

Be it known that I, JOEL BRYANT, of Brooklyn, in the county of Kings and State of New York, have invented a new and Improved Mode of Constructing Carpenters' Gages; and I hereby declare that the following is a full and correct description thereof, to wit:

The nature of my invention consists in providing gages with point-holders, so that the points, markers, or cutters of gages may be screwed out or in at pleasure by having a screw-thread cut within the said holders corresponding with and acting upon a screw-thread cut on the said points, markers, or cutters, so as to raise or lower them on the principle of the screw.

To enable others skilled in the art to make and use my invention, I will more fully describe the construction and operation thereof, reference being made to the accompanying drawings, as forming a part of this specification.

In the construction of my gages, Figure 1 is a perspective view; Fig. 2, a longitudinal section; Fig. 3, the sliding catch of the holders in the mortising-gage; Fig. 4, one of the points or markers; Fig. 5, one of the cutters, and Fig. 6 the lower sliding bar, showing the opening for the points and cutters.

The gages are made of any suitable material and of any desirable size or form. I construct the mortising-gage, Fig. 1, with an additional sliding bar, *a*, in the top part of the gage. Through this sliding bar *a* and the other sliding bar, *b*, I set one of the holders *c*, having previously cut out the middle portion of the gages, leaving the opening *d*, to allow the back holder, *c*, to move back and forth through the said openings *d* by means of the bars *a* and *b*, in which the said holder *c* is set. The other point-holder, *g*, is set just forward of the said opening *d*, and is stationary, except as it turns in its bed *o*, and is retained in its place by the sliding catch *i*, placed beneath the sliding bar *b*. The said sliding catch *i* also receives and retains the other point-holder, *g*, which it receives through the opening *j*, from which it slides forward through the opening *k*, the sides *l* of the said sliding catch *i* entering the grooves *m* and *n* in the said point-holders *g* and *c*, and thus prevent them from being pressed out of their place or beds *o* in the sliding bar *b* or in the metal face *p*. The metal face *p*, as shown by Fig. 7, has an elevation on its inner surface, as shown by Fig. 8, in which the pit *o* is formed to receive the end of the point-holder *g*, or the front point-holder, *g*, may be retained in place by means of a nut screwed on its point, the bed of the nut being sufficiently large to allow the said nut to turn in its bed with the said point-holder *g*. This arrangement is shown in the drawings by Fig. 9. The point-holders *g* and *c* of the said mortising-gages, Figs. 1 and 2, are made round, like a hollow tube, with a screw-thread cut on the inside to receive the said points, markers, or cutters with a corresponding screw-thread cut thereon, the top part of the said holders *g* and *c* being flattened, so as to be conveniently grasped with the thumb and finger for operating the same. The points or markers of the said mortising-gages are made square at their lower extremities and sharp at the point, while the upper part is made round, with a screw-thread cut thereon corresponding to the screw-thread cut within the said holders, into which they are received and retained for service. The markers for the said mortising-gages are shown in the drawings by Fig. 4. The cutters, Fig. 5, are made in the same way, except that the lower part is made flat, instead of being square. The markers and cutters, Figs. 4 and 5, in the said mortising-gages, Figs. 1 and 2, are operated by turning the said holders *g* and *c*, so as that the said markers or cutters are raised or lowered at pleasure, on the principle of the screw, the said points, markers, or cutters being made as above described or in any other way or manner equivalent thereto.

The advantages of my invention in its arrangement in mortising-gages, as above described, are, first, the convenience of raising or lowering the points, markers, and cutters; secondly, the convenience of changing the markers for the cutters, and vice versa; thirdly, making the mortising-gage answer a threefold purpose—viz., the purpose of a mortising-gage when both markers are down, the purpose of the single or common gage when one of the markers is screwed up so as not to mark, and the purpose of a cutting-gage by removing the markers and introducing the cutters in their stead for the cutting of thin boards and veneering.

It will be observed that the foregoing description relates, principally, to mortising-gages, yet it will be distinctly understood that I claim the use of point-holders for every kind of gage, as that they are equally applicable to one kind as to another, and that I do not confine my claim to any definite form or kind of holder for the points, markers, or cutters as herein described, but claim the right to use any and every form or kind of holder, means, or contrivance having a screw-thread cut within the same, and through the instrumentality of which the said points, markers, or cutters, with a corresponding screw-thread cut thereon, are raised or lowered, protruded, or drawn in by means of the said screw-thread within the said holders and a corresponding screw-thread upon the said points, markers, or cutters when operated for that purpose.

Of course I do not claim the invention of gages, nor the invention and use of markers or cutters for gages unless operated as herein set forth.

What I do claim, and what I desire to secure by Letters Patent, is as follows:

The invention and exclusive use of point-holders, or holders for the the points, markers, or cutters of gages and instruments equivalent thereto, irrespective of any particular or definite form or kind of gage and irrespective of any definite form or kind of holder, means, or contrivance having a screw-thread cut within the same, and corresponding with a screw-thread cut upon the said points, markers, or cutters, so as that the said points, markers, or cutters are operated within the said holders to be raised or lowered through the instrumentality of the said screw-threads within the said holders and upon the said points, markers, or cutters of the said gages or instruments equivalent thereto, as herein set forth.

JOEL BRYANT.

Witnesses:
EDMUND B. SMITH,
O. H. GARDINER.